United States Patent
Takahashi et al.

[19]

[11] Patent Number: 5,853,074
[45] Date of Patent: Dec. 29, 1998

[54] VISCOUS FLUID COUPLING

[75] Inventors: Hideaki Takahashi; Ryuji Nakamura, both of Okazaki; Seiya Tanaka, Kariya, all of Japan

[73] Assignee: Aisin Seiki Kabushiki Kaisha, Aichi, Japan

[21] Appl. No.: 829,236

[22] Filed: Mar. 31, 1997

[30] Foreign Application Priority Data

Mar. 29, 1996 [JP] Japan .................................... 8-076512

[51] Int. Cl.⁶ ................................................. F16D 35/02
[52] U.S. Cl. .................................. 192/58.682; 192/58.7; 192/82 T
[58] Field of Search ............................ 192/58.682, 58.7, 192/82 T

[56] References Cited

U.S. PATENT DOCUMENTS

| | | | |
|---|---|---|---|
| 4,076,110 | 2/1978 | Tinholt | 192/58.7 X |
| 4,979,601 | 12/1990 | Hagiwara et al. | 192/58.7 |
| 5,101,950 | 4/1992 | Schoenmeyer | 192/58.7 |
| 5,237,965 | 8/1993 | Harima | 192/58.7 X |

*Primary Examiner*—Richard M. Lorence
*Attorney, Agent, or Firm*—Hazel & Thomas, PC

[57] ABSTRACT

A viscous fluid coupling which includes an input member having a rotatable shaft and a rotor secured to the shaft is disclosed. The viscous fluid coupling further comprises an output member rotatable disposed on the shaft and having a first chamber in which the rotor is disposed therein and a second chamber which is communicated to the first chamber through a passage, a torque transmitting mechanism for transmitting rotational torque from the input member to the output member through the viscous fluid and formed between an inner wall of the first chamber and an opposing surface of the rotor, a pumping mechanism pumping out the viscous fluid from the first chamber into the second chamber in accordance with the relative rotation between the input member and the output member and a valve device for opening and closing the passage according to an atmospheric temperature, wherein the torque transmitting mechanism is located in the diametrical direction so that amount of the viscous fluid in the torque transmitting mechanism varies when the shaft is rotated and based on the closing condition of the valve device.

2 Claims, 3 Drawing Sheets

VISCOUS FLUID COUPLING

BACKGROUND OF THE INVENTION

1. Field of the Invention

The present invention relates to a viscous fluid coupling for transmitting rotational torque from an input member to an output member through viscous fluid and, more particularly, to a viscous fluid coupling employed in a radiator cooling fan drive mechanism of an internal combustion engine.

2. Description of the Prior Art

A conventional viscous fluid coupling of this kind includes an input member having a rotatable shaft and a rotatable disc-shaped rotor secured to the shaft, an output member rotatably disposed on the shaft and having a first chamber in which the rotor is disposed therein and a second chamber which communicates with the first chamber through a passage means, a torque transmitting means for transmitting rotational torque from the input member to the output member through viscous fluid and formed between an inner wall of the first chamber and an opposing surface of the rotor, a pumping mechanism pumping out viscous fluid from the first chamber into the second chamber in accordance with the relative rotation between the input member and the output member and valve means for opening and closing the passage means according to a temperature around the coupling.

Viscous fluid is filled in the first and second chambers to a predetermined level and the rotational torque of the rotor is transmitted to the output member by shearing stress of the viscous fluid located between the inner wall of the first chamber and the opposing surface of the rotor when the rotor is rotated. The valve means controls the amount of viscous fluid located between the inner wall of the first chamber and the opposing surface of the rotor so as to increase in response to the temperature around the coupling. The rotational speed of a radiator cooling fan, which is secured to the output member, is thereby controlled in response to the temperature.

In the above mentioned coupling, the viscous fluid becomes stagnant in the lower portion of the coupling by reason of lack of power during a non-operational period, filling the first and second chambers with the viscous fluid. The torque is propagated from the input-side by the viscous fluid with which the first chamber is filled when the operation resumes. The fan continues to rotate undesirably at a high velocity till the viscous fluid is pumped from the first chamber into the second chamber. In such case, if the atmosphere is adequately high in temperature and the valve means is thus kept open, no problem is produced. However, if the atmosphere is at a low temperature, there arise problems such as deterioration both in a warm-up speed of the engine and in the efficiency of a heater, or the creation of noises caused by the fan immediately is after restarting the operation.

A conventional viscous fluid coupling has been proposed in Japanese Patent Application Laid-Open Publication No. 63 (1988)-180727 to obviate the above-described defects. In this coupling, the output member is further provided with a third chamber so that the first chamber is located between the second chamber and the third chamber in the axial direction. The third chamber communicates with the first chamber through an orifice. With this arrangement, since the amount of the viscous fluid in the first chamber is decreased when the rotation of the shaft stops, a so-called taking around phenomenon that is present when the engine starts can be eliminated. In this coupling, however, the components increase in number and hence the structure become complicated with a heavier weight. Consequently, the costs of production go up. Furthermore, the axial length of the coupling becomes longer and hence there is a restriction in the installation of the coupling in an engine which is a restricted space.

SUMMARY OF THE INVENTION

It is, therefore, an object of the present invention to provide an improved viscous fluid coupling which overcomes the above drawbacks.

It is another object of the present invention to provide an improved viscous fluid chamber which can prevent a so-called taking around phenomenon without increasing the number of the components and the size.

In order to achieve these objectives, there is provided an improved to viscous fluid coupling which includes an input member having a rotatable shaft and a rotor secured to the shaft, an output member rotatably disposed on the shaft and having a first chamber in which the rotor is disposed therein and a second chamber which communicates with the first chamber through a passage means, torque transmitting means for transmitting rotational torque from the input member to the output member through viscous fluid and formed between an inner wall of the first chamber and an opposing surface of the rotor, a pumping mechanism for pumping out viscous fluid from the first chamber into the second chamber in accordance with the relative rotation between the input member and the output member and valve means for opening and closing the passage means according to an atmospheric temperature, wherein the torque transmitting means is located in the diametrical direction so that the viscous fluid is not located in the torque transmitting means when the shaft is rotated under the closing condition of the valve means.

BRIEF DESCRIPTION OF THE DRAWINGS

Additional objects and advantages of the present invention will become more apparent from the following detailed description of a preferred embodiment thereof when considered with reference to the attached drawings, in which.

DESCRIPTION OF THE PREFERRED EMBODIMENTS

A viscous fluid coupling in accordance with a preferred embodiment of the present invention will now be described with reference to the attached drawings.

Figure 1:
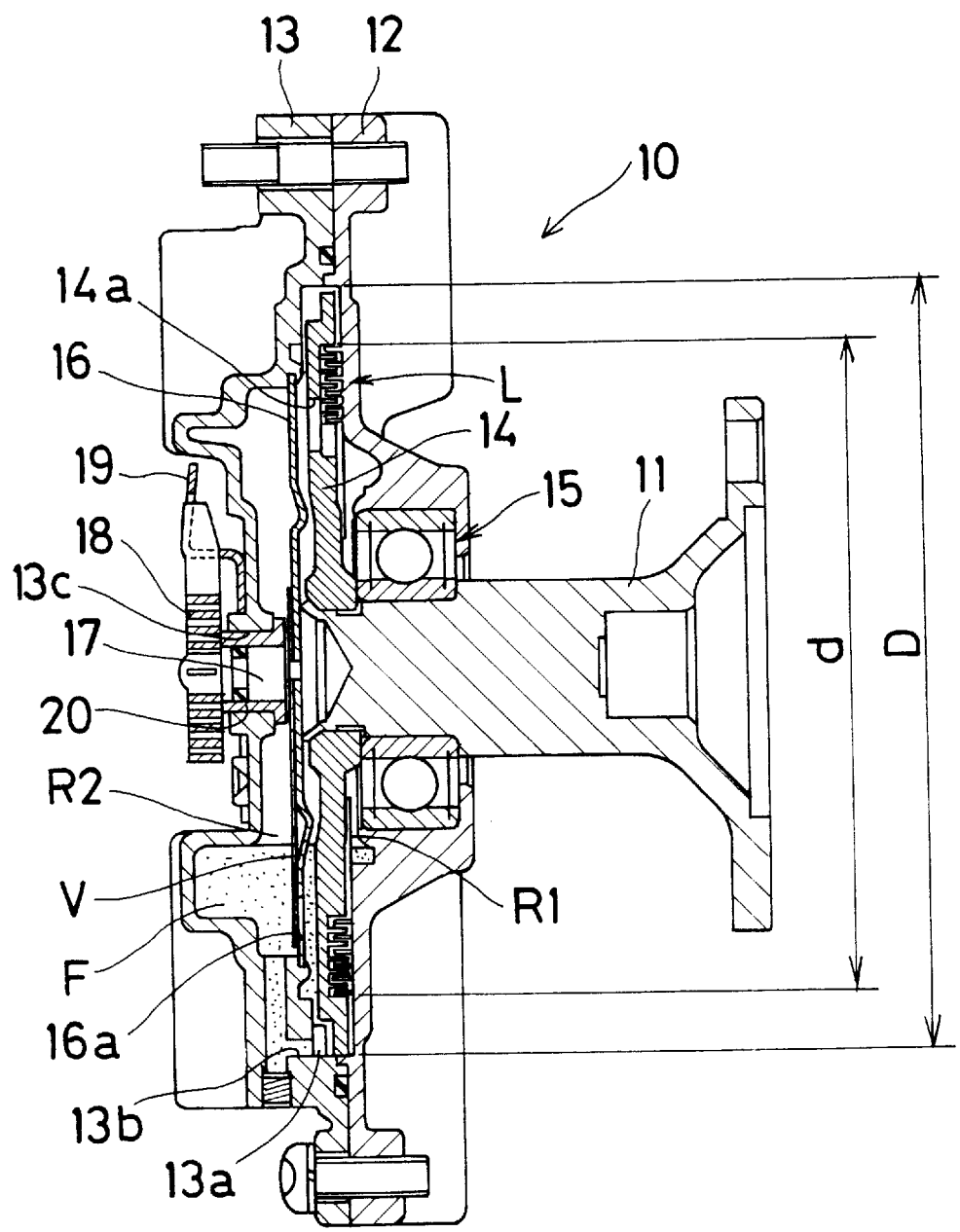
FIG. 1 shows a sectional view of an embodiment of a viscous fluid coupling at the stop condition in accordance with the present invention.
Figure 2:
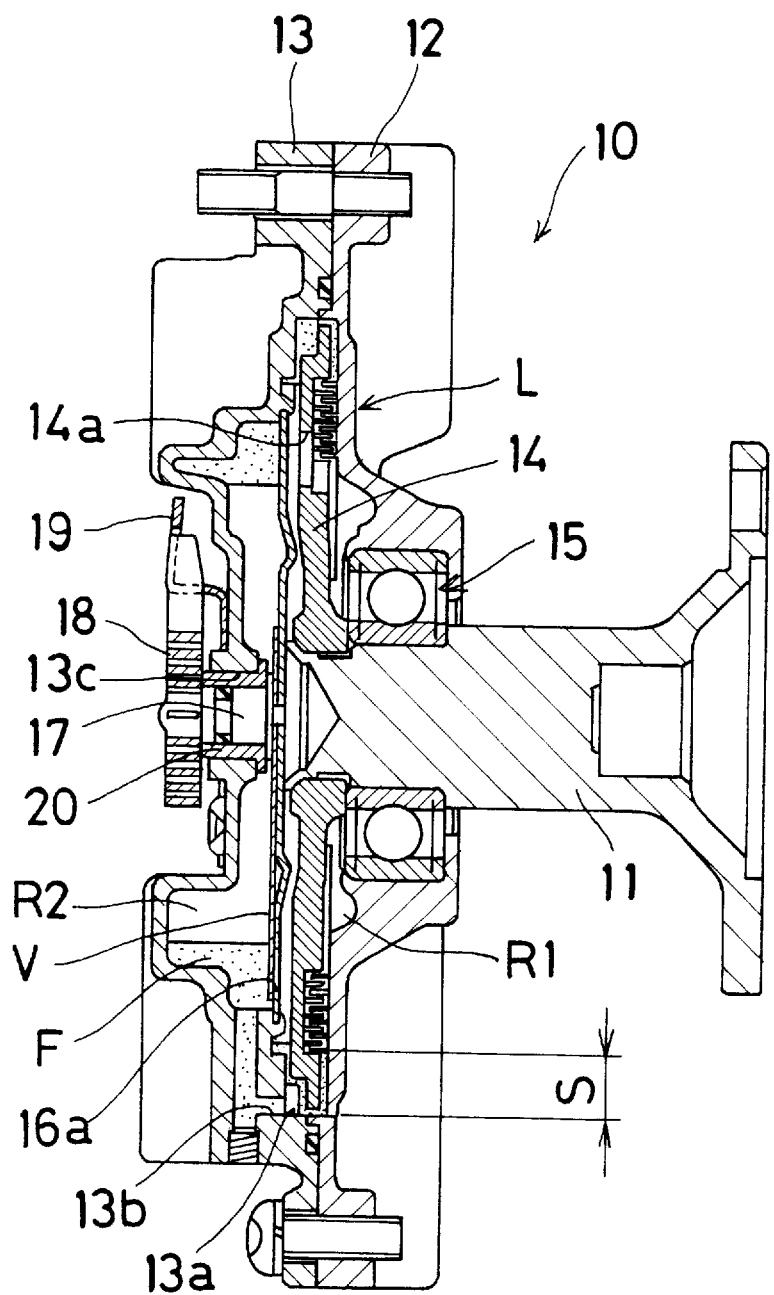
FIG. 2 illustrates a sectional view of an embodiment of a viscous fluid coupling at the operating condition in accordance with the present invention.

FIGS. 1 and 2 show a viscous fluid coupling 10 employed in a radiator cooling fan drive mechanism of an internal combustion engine (not shown). Referring to FIGS. 1 and 2, a rotor 14 is fixed on a shaft 11 which is driven by the engine, and housings 12 and 13 (output member) are rotatably disposed on the shaft 11. The housing 12 is rotatably supported on the shaft 11 through a bearing 15 and is affixed by screws to the housing 13 having a hollow portion. A plate 16 (output member) is affixed to the adjacent portion of the opening end of the hollow portion of the housing 13 and a rotor chamber (first chamber) R1 is defined among the housing 12, the housing 13 and the plate 16. A storage chamber (second chamber) R2 is defined between the plate 16 and the hollow portion of the housing 13. The rotor 14 is disposed in the rotor chamber RI. The surfaces of the housing 12 and the rotor 14 which confront each other have labyrinth grooves, respectively constituting a labyrinth mechanism L (torque transmitting means).

A hole 13b is formed in the housing 13. One end of the pumping hole 13b communicates with the storage chamber R2 and the other end of the pumping hole 13b communicates with the outer peripheral portion of the rotor chamber R1. A projection 13a which is projected into the outer peripheral portion of the rotor chamber R1 is formed on the housing 13. The projection 13a is adjacent to the hole 13b in the circumferential direction. The projection 13a and the hole 13b constitute a pumping mechanism which pumps out the fluid from the rotor chamber R1 into the storage chamber R2. In this embodiment, shown in FIG. 1, the position of the labyrinth mechanism L in the diametrical direction is determined so that a relationship between a diameter D of the rotor chamber RI and an outer diameter d of the labyrinth mechanism L becomes d/D<0.86.

A passage 16a, which communicates between the rotor chamber R1 and the storage chamber R2, is formed on the plate 16. A hole 14a is formed on a portion of the rotor 14 at which an inner peripheral portion of the labyrinth mechanism L is located. The hole 14a is located where the circle on which the passage 16a is located with respect to the axial center of the shaft 11. Therefore, the viscous fluid, which is supplied from the storage chamber R2 into the rotor chamber R1 through the passage 16a, is led to the labyrinth mechanism L through the hole 14a.

The housing 13 is provided with a hole at its axial center, and a rod 17 is fluid-tightly and rotatably fitted into the hole of 13c the housing 13 through a bushing 20. On one end of the rod 17, which is projected into the storage chamber R2, a plate shaped valve V which can open and close the passage 16a in response to the rotation of the rod 17 is fixed thereon. On the other end of the rod 17 which projects outside, a bi-metal spiral spring element 18 is disposed thereon. One end of the bi-metal spiral spring element 18 is engaged with the other end of the rod 17 and the other end of the bi-metal spiral spring element 18 is engaged with an engaging portion 19 which is formed on the housing 13. The bi-metal spiral spring element 18 expands and contracts in response to the atmospheric temperature of the engine. The rod 17 rotates in one direction and in the other direction and the valve V opens and closes the passage 16a in response to the temperature.

In the above-mentioned viscous fluid coupling, in the event that the engine stops and that the atmospheric temperature of the engine is lower than a predetermined value, the valve V completely closes the passage 16a. In this condition, since the rotor chamber R1 is communicated to the storage chamber R2 through the hole 13b, the level of the viscous fluid F, e.g., silicon oil, in the rotor chamber R1 and the storage chamber R2 is in the condition shown in FIG. 1. In this embodiment, the amount of the viscous fluid F in the rotor chamber R1 at this condition is determined to be 29 cc.

In this condition, when the engine is started and the rotor 14 is rotated, the viscous fluid F in the rotor chamber R1 flows outward in the diametrical direction by the centrifugal force. At this time, in this embodiment, since the relationship between the diameter D of the rotor chamber R1 and the outer diameter of the labyrinth mechanism L becomes d/D<0.86, the inner peripheral border portion of the viscous fluid F forms in the diametrical direction in and around the outer portions of the labyrinth mechanism L and of the rotor 14. Therefore, since the viscous fluid is located mostly outside the labyrinth mechanism L, the shearing stress (force) generated between the rotor 14 and the housing 12 is reduced and the torque transmitting ability for transmitting the rotational torque from the rotor 14 to the housing 12 becomes low. Now, in FIG. 2, the torque transmitting ability in a domain S is extremely low, lower than that of the labyrinth mechanism L. Accordingly, the undesirable torque transmission is avoided and the undesirable rotation of the fan fixed to the housing 13 with a high velocity is prevented.

Figure 3:
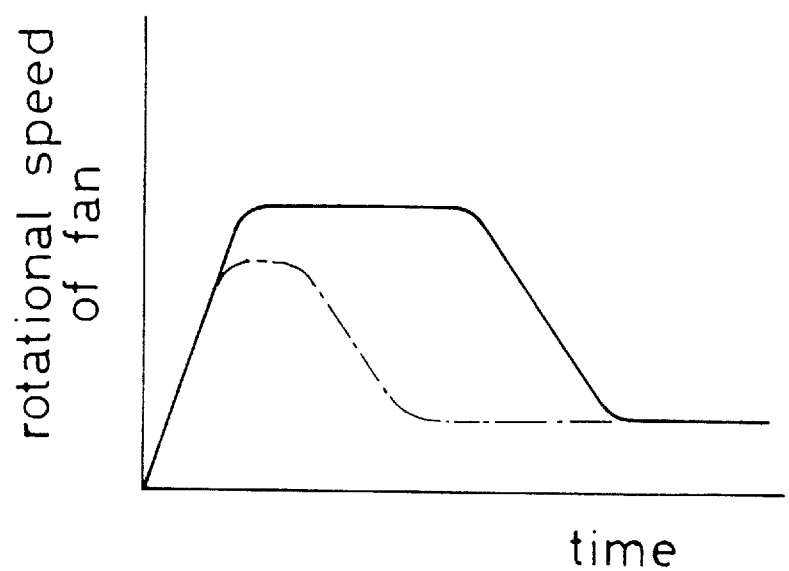
FIG. 3 is a graphical representation with the time elapsed when the engine is started at a low temperature on the horizontal axis and with a rotational speed of a fan on the vertical axis.

FIG. 3 shows a variation of the rotational speed of the fan after the engine is started at low temperature. In the prior art viscous fluid coupling, which the radial position of the labyrinth mechanism is not determined as the present invention, the rotational torque is transmitted from the rotor (input member) to the housing (output member) through the viscous fluid which is located in the labyrinth mechanism. Therefore, as shown by a solid line in FIG. 3, the rotational speed of the fan increases and it takes longer to be pumped out from the rotor chamber into the storage chamber by the pumping mechanism. On the other hand, according to this embodiment, as shown by a broken line in FIG. 3, since the viscous fluid is mostly located outside the labyrinth mechanism L, any increase of the rotational speed of the fan is suppressed and the viscous fluid in the rotor chamber R1 is rapidly pumped out into the storage chamber R2 by the pumping mechanism.

When the atmospheric temperature becomes gradually higher, the valve V opens the passage 16a gradually. The amount of viscous fluid F located in the labyrinth mechanism L is thereby increased and, therefore, the shearing stress (force) becomes larger. As a result, the rotational speed of the fan is increased in response to the atmospheric temperature.

As mentioned above, according to the present invention, the viscous fluid in the first chamber is prevented from locating in the torque transmitting means when the shaft is rotated at a low temperature. Accordingly, the so-called "taking around phenomenon" which is present when the engine starts at the low temperature can be eliminated.

Furthermore, according to the present invention, this effect is obtained by the determination of the radial position of the torque transmitting means in the first chamber. Accordingly, the above mentioned effect can be obtained without increasing the number of the components and the size.

The principles, a preferred embodiment and modes of operation of the present invention have been described in the foregoing description. The invention which is intended to be protected herein should not, however, be construed as limited to the particular forms disclosed, as these are to be regarded as illustrative rather than restrictive. Variations and changes may he made by those skilled in the art without departing from the spirit of the present invention. Accordingly, the foregoing detailed description should be considered exemplary in nature and not be limited to the scope and spirit of the invention as set forth in the appended claims.

What is claimed is:

1. A viscous fluid coupling comprising:

an input member having a rotatable shaft and a rotor secured to said shaft;

an output member rotatably disposed on said shaft and having a first chamber in which said rotor is disposed therein and a second chamber communicatively connected to said first chamber through a passage means;

torque transmitting means for transmitting rotational torque from said input member to said output member through viscous fluid and formed between an inner wall of said first chamber and an opposing surface of said rotor;

a pumping mechanism pumping out viscous fluid from said first chamber into said second chamber in accordance with the relative rotation between said input member and said output member; and valve means for opening and closing said passage means according to an atmospheric temperature;

wherein said transmitting means is located in the diametrical direction and formed such that an inner peripheral border portion of the viscous fluid forms in the diametrical direction around outer portions of said torque transmitting means when the shaft is rotated under the closing condition of the valve means.

2. The viscous fluid coupling as claimed in claim 1, wherein the torque transmitting means is comprised of labyrinth grooves which are formed on surfaces of the rotor and the output member confronts said torque transmitting means.

* * * * *